United States Patent [19]
Nakatsuka et al.

[11] Patent Number: 5,088,766
[45] Date of Patent: Feb. 18, 1992

[54] STEERING SYSTEM FOR VEHICLE

[75] Inventors: Hiroshi Nakatsuka; Isao Hirashima; Masatoshi Takayama; Shigefumi Kohno, all of Hiroshima, Japan

[73] Assignee: Mazda Motor Corporation, Hiroshima, Japan

[21] Appl. No.: 596,284

[22] Filed: Oct. 12, 1990

[30] Foreign Application Priority Data
Oct. 13, 1989 [JP] Japan .................................. 1-267663

[51] Int. Cl.⁵ ............................................. B62D 1/18
[52] U.S. Cl. ..................................... 280/775; 74/493; 180/270
[58] Field of Search ..................... 74/493; 280/775; 180/270, 78

[56] References Cited
U.S. PATENT DOCUMENTS
4,934,737  6/1990  Nakatsuka ........................... 280/775
4,978,137 12/1990  Futami et al. ....................... 280/775

FOREIGN PATENT DOCUMENTS
60-157962  8/1985  Japan .

Primary Examiner—Charles A. Marmor
Assistant Examiner—Paul Dickson
Attorney, Agent, or Firm—Sixbey, Friedman, Leedom & Ferguson

[57] ABSTRACT

A steering system for a vehicle has a tilt mechanism for adjusting the height of a steering wheel. The steering wheel can be tilted through a larger angular range while the vehicle is parking but is inhibited from being tilted out of a smaller angular range included in the larger angular range while the vehicle is running.

28 Claims, 4 Drawing Sheets

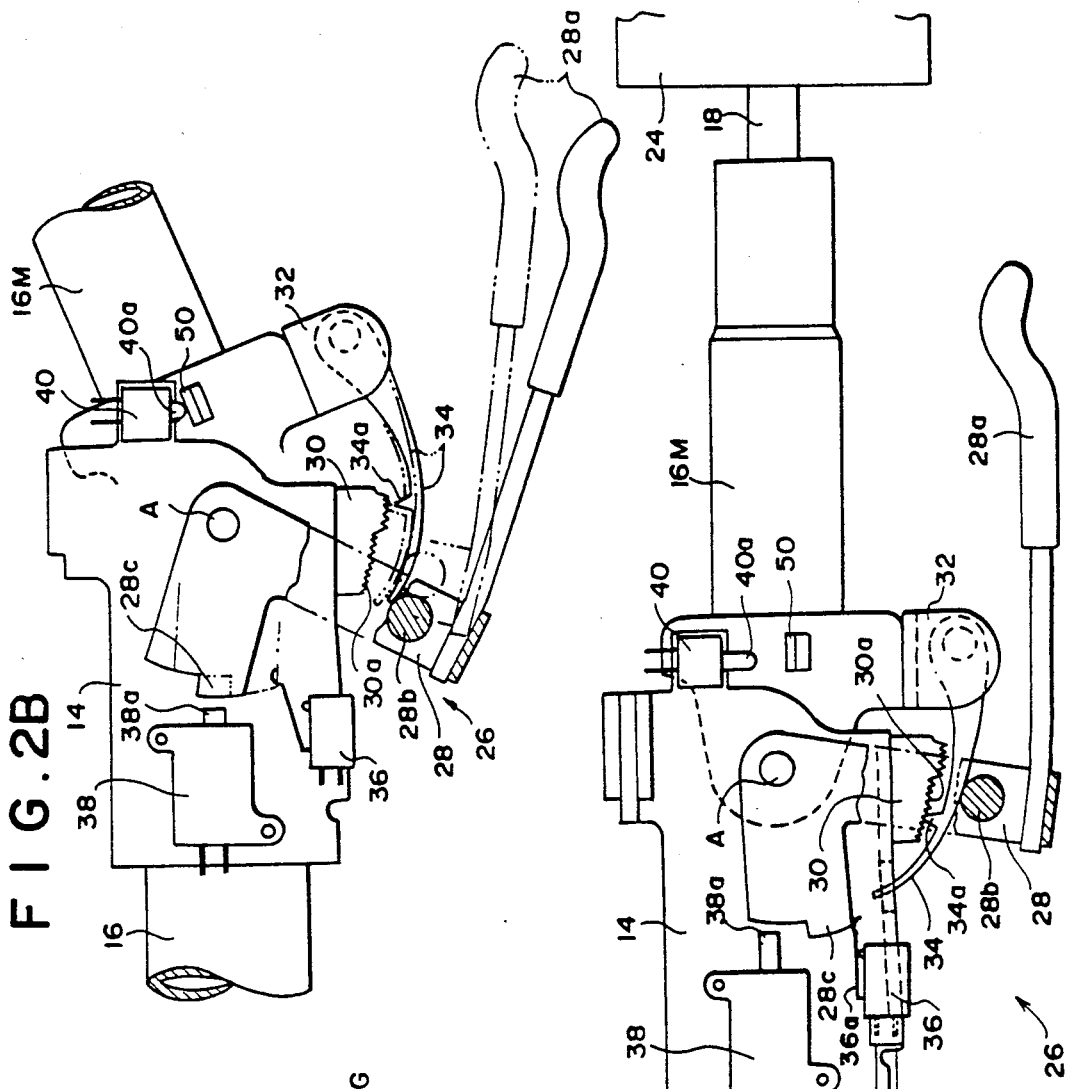

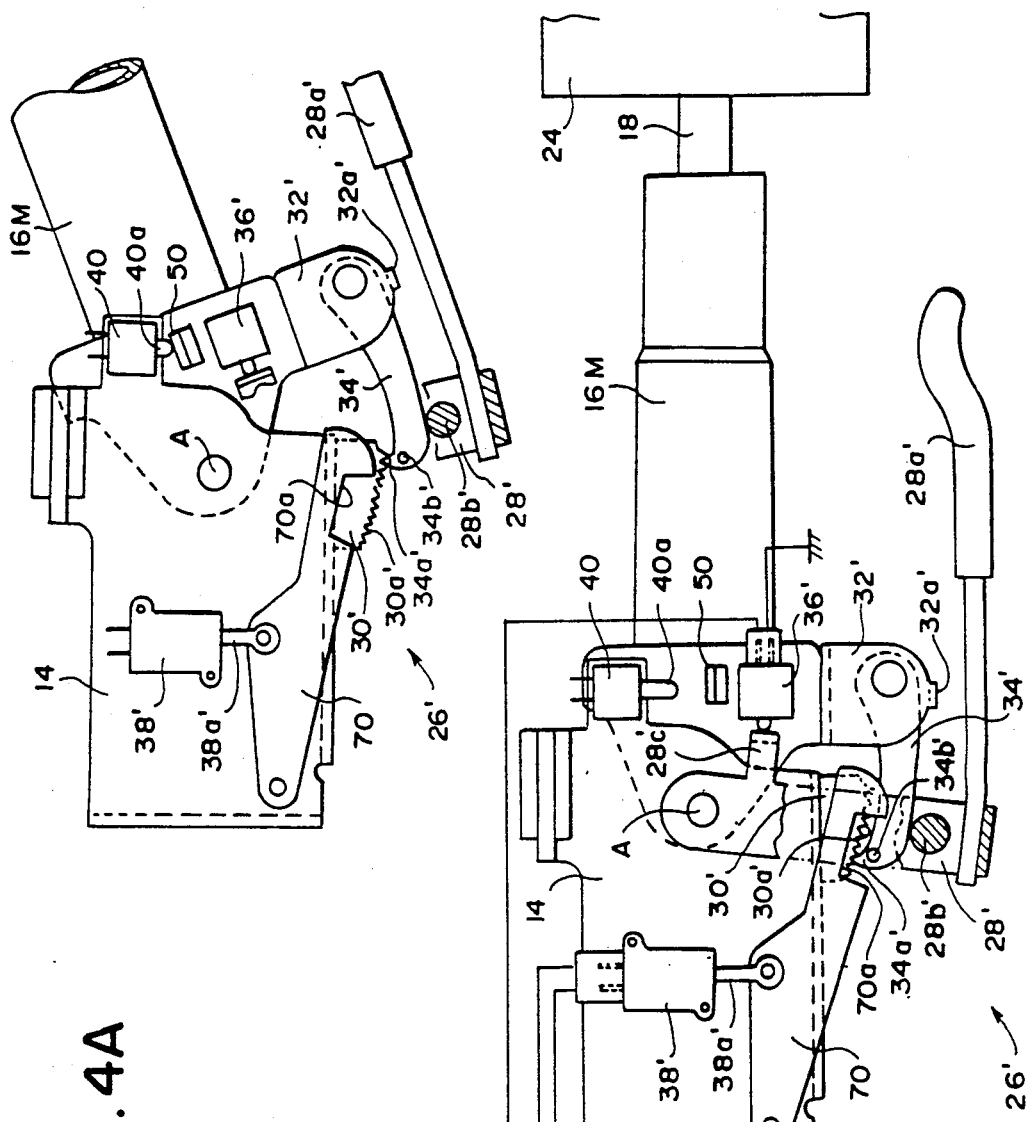

STEERING SYSTEM FOR VEHICLE

BACKGROUND OF THE INVENTION

1. Field of the Invention

This invention relates to a steering system for a vehicle provided with a tilt mechanism.

2. Description of the Prior Art

There has been in wide use a steering system having a tilt mechanism for adjusting the height of the steering wheel. (See Japanese Unexamined Patent Publication No. 60(1985)-157962, for instance.) In order to obtain a height of the steering wheel which is appropriate to each driver, the steering wheel need not be movable by a large angle. Further, in the case of a vehicle in which an air bag unit is mounted on the steering wheel, the steering wheel must be positioned in a predetermined area since otherwise the driver cannot be sufficiently protected by the air bag eve if it inflates upon collision. Accordingly, conventionally the tilting angle range through which the steering wheel can be tilted has been limited. On the other hand, in view of facilitation of getting on and off the vehicle or in view of comfort during parking, it is desirable that the steering wheel can be tilted by a large angle.

SUMMARY OF THE INVENTION

In view of the foregoing observations and description, the primary object of the present invention is to provide a steering system for a vehicle which can satisfy both the demand on the safety during running and the demand for facilitation of getting on and off the vehicle or comfort during parking.

In accordance with the present invention, there is provided a steering system for a vehicle comprising a tilt mechanism for adjusting the height of a steering wheel characterized in that said tilt mechanism comprises a lock means which locks the steering wheel in a plurality of desired positions within a larger angular range, a lock release means which releases the lock means to permit the steering wheel to be tilted within the larger angular range, and a tilt limit means which inhibits the steering wheel from being tilted out of a smaller angular range while the vehicle is running, the smaller angular range being included in the larger angular range.

BRIEF DESCRIPTION OF THE DRAWINGS

FIGS. 2A and 2B are side views showing in detail the tilt mechanism of the steering system shown in FIG. 1, FIGS. 4A and 4B are views similar to FIGS. 2A and 2B but showing another embodiment of the present invention.

DESCRIPTION OF THE PREFERRED EMBODIMENT

Figure 1:
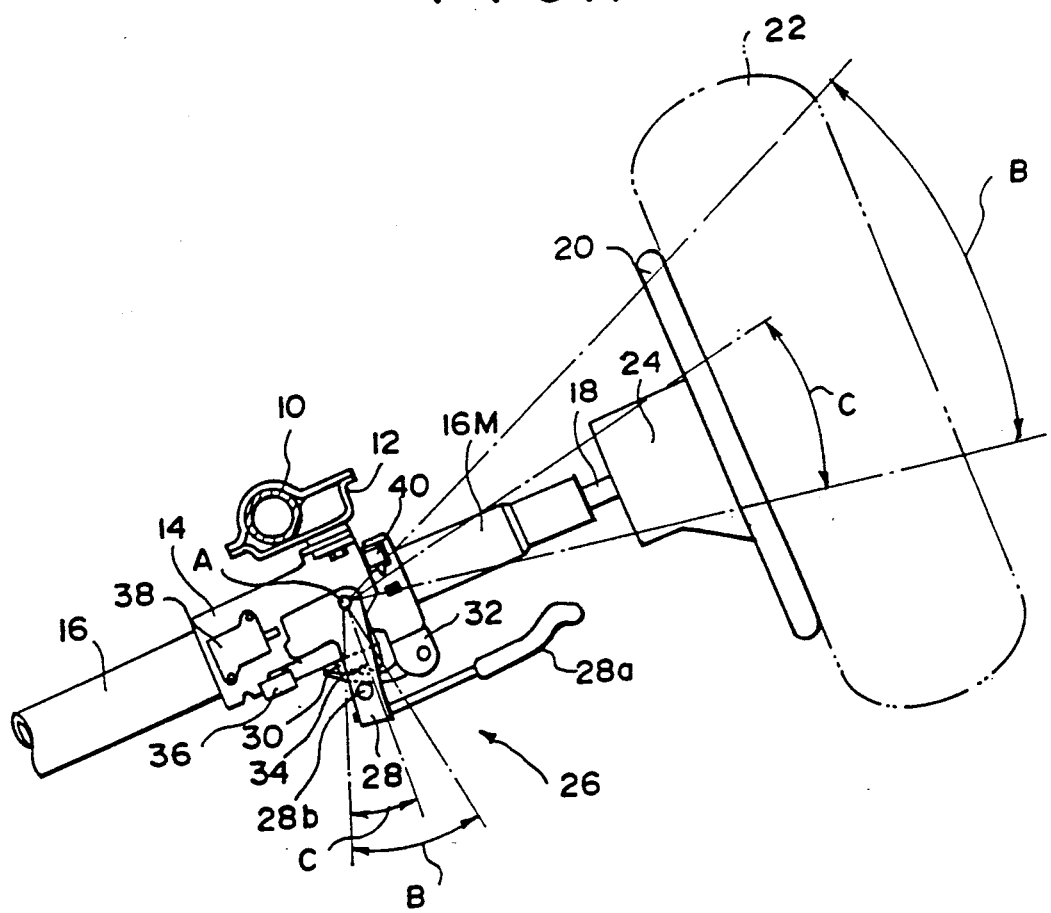
FIG. 1 is a side view showing a steering system in accordance with an embodiment of the present invention.

In FIG. 1, a steering system in accordance with an embodiment of the present invention comprises a steering column 16 which is fixed to a steering support pipe 10, which extends in the transverse direction of the vehicle body at the front of the passenger room of a vehicle, by way of a steering bracket 12 and a tilt bracket 14. A steering shaft 18 is supported for rotation in the steering column 16, and a steering wheel 20 is fixed to the rear end of the steering shaft 18. The steering wheel 20 is provided with an air bag unit 24 having an air bag 22 which inflates as shown by the chained line in FIG. 1 upon collision.

Further, the steering system is provided with a tilt mechanism 26 which permits the steering wheel 20 to be tilted about point A so that the height of the steering wheel 20 can be adjusted.

The tilt mechanism 26 permits the portion of the steering column 16 behind the point A together with the steering wheel 20 to tilt about the point A within the angular range indicated at B, and holds them at any angular position within the range B. That is, the tilt mechanism 26 comprises an operating lever 28 which is supported for rotation about the point A, a fixed tooth member 30 which is fixed to the lower surface of the tilt bracket 14, and an engagement lever 34 which is supported for rotation on a bracket 32 fixed to the movable part 16M of the steering column 16 (the portion of the steering column 16 behind the point A) and is adapted to be engaged with the fixed tooth member 30. The operating lever 28 is provided with a handle portion 28a and an abutment pin 28b. When the handle portion 28a of the operating lever 28 is in the upper position (lock position) shown in FIG. 1, the abutment pin 28b keeps the engagement lever 34 in engagement with the fixed tooth member 30 and accordingly, the movable part 16M of the steering column 16 cannot be tilted. When the handle portion 28a is moved downward, the abutment pin 28b releases the engagement lever 34 from the fixed tooth member 30 and the movable part 16M is permitted to tilt about the point A. Accordingly, by tilting the movable part 16M of the steering column 16 to a desired position while the handle portion 28a of the operating lever 28 is held in a lower position and then returning the handle portion 28a to the upper position, the height of the steering wheel 20 can be adjusted.

A tilt lock switch 36, a tilt limit solenoid 38 and an overshoot detecting switch switch 40, whose purpose will become apparent later, are mounted on the tilt bracket 14.

The tilt mechanism 26 will be described in more detail with reference to FIG. 2A, hereinbelow.

As shown in FIG. 2A, a plurality of teeth 30a are formed on the lower surface of the fixed tooth member 30. The lower surface of the fixed tooth member 30 comprises a front portion inclined downward toward the rear and a rear portion which is also inclined downward toward the rear and projects downward beyond the lower surface of the front portion so that a shoulder is formed therebetween. Two thirds of the teeth 30a are formed on the front portion and one third of the teeth 30a are formed on the rear portion. The engagement lever 34 is curved upward toward the front and an triangular tooth 34a projects upward from the upper surface of the engagement lever 34. The position of two of the teeth 30a in mesh with the tooth 34a determine the angular position of the movable part 16M of the steering column 16. When the tooth 34a is in mesh with the teeth on the front portion of the fixed tooth member 30, the steering wheel 20 is within the angular range indicated at C in FIG. 1. When the steering wheel 20 is tilted upward beyond the upper limit of the angular range C, the tooth 34a comes into mesh with the teeth 30a on the rear portion of the fixed tooth member 30.

When the steering wheel 20 is tilted within the angular range C, the tooth 34a can be released from the teeth 30a by clockwisely swinging the handle portion 28a of the operating lever 28 by a relatively small angle, thereby moving the abutment pin 28b away from the engagement lever 34 by a relatively small distance.

In order to tilt the steering wheel 20 beyond the upper limit of the angular range C, the tooth 34a on the engagement lever 34 must clear the shoulder between the front and rear portions of the fixed tooth member 30. Accordingly, the steering wheel 20 it to be tilted beyond the upper limit of the angular range C, the handle portion 28a of the operating lever 28 is clockwisely swung by a large angle to the position shown by the solid line in FIG. 2B. Then by counterclockwisely swinging the handle portion 28a to the position shown by the chained line in FIG. 2B after the steering wheel 20 is tilted to a desired position, the steering wheel 20 can be locked at the desired position.

As shown in FIG. 2A, the tilt lock switch 36 and the tilt limit solenoid 38 are connected to a tilt steering control box 42 which is energized when the ignition switch is ON. The tilt lock switch 36 has an arm 36a, and while the arm 36a is pushed down as shown in FIG. 2A, the tilt lock switch 36 is OFF and when the arm 36a is released, the tilt lock switch 36 is turned ON. The operating lever 28 has a projection 28c and when the operating lever 28 is in the lock position shown in FIG. 2A, the projection 28c holds down the arm 36a of the tilt lock switch 36. Further, a vehicle speed sensor 44, a parking brake switch 46 and a parking switch 48 are connected to the tilt steering control box 42. The parking brake switch 46 outputs an ON-signal when the parking brake is applied and the parking switch 48 outputs an ON-signal when the selector lever of the automatic transmission is in P. When ON-signals are input into the tilt steering control box 42 from the tilt lock switch 36, the parking brake switch 46 and the parking switch 48 and at the same time, the vehicle speed detected by the vehicle speed sensor 44 is 0, the tilt limit solenoid 38 is turned ON. The tilt limit solenoid 38 has a rod 38a which is spring-urged toward the projected position shown in FIG. 2A. When the tilt limit solenoid 38 is OFF, the rod 38a is held in the projected position and when the tilt limit solenoid 38 is turned ON, the rod 38a is moved to the retracted position shown in FIG. 2B.

If the tilt limit solenoid 38 is turned ON and OFF independently from the position of the operating lever 28, i.e., ON and OFF of the tilt lock switch 36, the tilt limit solenoid 38 will be turned ON every time the vehicle speed parking brake is applied and the selector lever of the automatic transmission is moved in P and annoying sound will be produced.

When the rod 38a of the tilt limit solenoid 38 is in the projected position shown in FIG. 2A, clockwise rotation of the operating lever 28 up to the abutting position in which the projection 28c abuts against the rod 38a is permitted but further clockwise rotation of the operating lever 28 is inhibited. On the other hand, when the rod 38a of the tilt limit solenoid 38 is in the retracted position shown in FIG. 2B, the operating lever 28 can rotate in the clockwise direction by a larger angle over the abutting position. The tooth 34a on the engagement lever 34 cannot be moved over the shoulder between the front and rear portions of the fixed tooth member 30 until the operating lever is rotated in the clockwise direction over the abutting position. That s, the steering wheel 20 cannot be tilted upward beyond the upper limit of the angular range C until the tilt limit solenoid 38 is turned ON.

The overshoot detecting switch 40 has a push rod 40a, and when the steering wheel 20 is tilted upward beyond the upper limit of the angular range C and an abutment piece 50 fixed to the movable portion 16M of the steering column 16 pushes down the push rod 40a, the overshoot detecting switch 40 is turned ON.

Figure 3A:
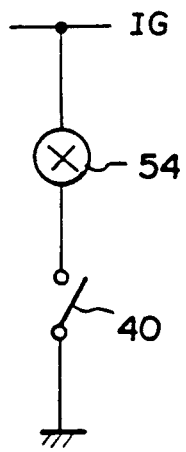
FIG. 3A shows the alarm circuit employed in the steering system.

As shown in FIG. 3A, the overshoot detecting switch 40 is connected in series with a warning lamp 54, and when the overshoot detecting switch 40 is turned ON, the warning lamp 54 is put on to inform that the steering wheel 20 has been tilted upward beyond the upper limit of the angular range C.

The operation of the steering system in accordance with this embodiment will be described, hereinbelow.

When the vehicle is running, neither of the parking brake switch 46 and the parking switch 48 outputs an ON-signal and the vehicle speed is not 0. Accordingly, the tilt limit solenoid 38 is not energized and the rod 38a is held in the projected position. In this state, clockwise rotation of the operating lever 28 up to the abutting position in which the projection 28c abuts against the rod 38a is permitted but further clockwise rotation of the operating lever 28 is inhibited. Accordingly, the steering wheel 20 can be tilted within the angular range C but cannot be tilted upward beyond the upper limit of the angular range C.

On the other hand, when the vehicle is parked for a time longer than a predetermined time, generally the parking brake is applied and the selector lever of the automatic transmission is moved in P. Of course, the vehicle speed is 0. Accordingly, when the operating lever 28 is clockwisely rotated from the position shown in FIG. 2A and the tilt lock switch 36 outputs an ON-signal, the tilt limit solenoid 38 is energized and the rod 38a is moved to the retracted position shown in FIG. 2B. In this state, the operating lever 28 can rotate over the abutting position, and the tooth 34a on the engagement lever 34 is permitted to move over the shoulder between the front and rear portions of the fixed tooth member 30. Accordingly, the steering wheel 20 can be tilted upward beyond the upper limit of the angular range C. When the steering wheel 20 is tilted upward beyond the upper limit of the angular range C, the overshoot detecting switch 40 is turned on, and the warning lamp 54 is put on.

As can be understood from the description above, while the vehicle is running, the steering wheel 20 can be tilted only within the angular range C which is relatively small. Accordingly, during running, the steering wheel 20 cannot be tilted to such a position in which the driver cannot be sufficiently protected by the air bag 22 even if it inflates upon collision. On the other hand, during parking, the steering wheel 20 can be tilted by a large angle so that getting on and off the vehicle is facilitated and the comfort in the vehicle is improved.

Figure 3B:
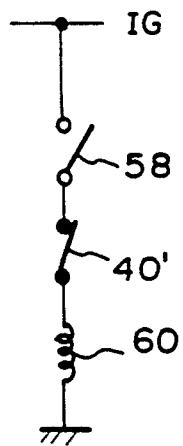
FIGS. 3B and 3C show modifications of the alarm circuit.
Figure 3C:
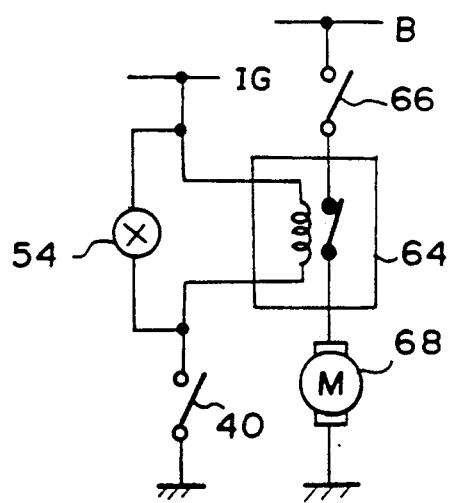

Instead of the alarm circuit shown in FIG. 3A, those shown in FIGS. 3B and 3C may be employed.

In the alarm circuit shown in FIG. 3B, a brake switch 58 which is turned on when the foot brake is applied and an overshoot detecting switch 40' which is turned off when the steering wheel 20 is tilted beyond the upper limit of the angular range C are connected in series between the power source IG and a shift lock solenoid 60. The shift lock solenoid 60 normally locks the selector lever in P, and permits it to be shifted into other positions when energized. Accordingly, the selector lever cannot be moved from P until the steering wheel 20 is returned to a position within the angular range C and the foot brake is applied.

In the alarm circuit shown in FIG. 3C, a relay 64 is inserted between a starter switch 66 and a starter motor 68, and the relay winding of the relay 64 is connected in parallel with the warning lamp 54 which is connected in series with the overshoot detecting switch 40 as in the alarm circuit shown in FIG. 3A. Accordingly, in this alarm circuit, while the steering wheel 20 is outside the angular range C, the starter motor 68 cannot be energized and the warning lamp 54 is on.

FIGS. 4A and 4B show a tilt mechanism 26' which is employed in a steering system in accordance with another embodiment of the present invention.

In FIGS. 4A and 4B, a tilt limit lever 70 is mounted for rotation on the tilt bracket 14 and is connected to a rod 38a' of a tilt limit solenoid 38' so that the tilt limit lever 70 is held in the retracted position shown in FIG. 4B when the tilt limit solenoid 38' is energized and the rod 38a' is retracted, and is moved to the operative position shown in FIG. 4A when the tilt limit solenoid 38' is de-energized and the rod 38a' is projected under the force of the spring. The tilt limit lever 70 is provided with a channel-shaped cutaway portion 70a formed in the free end portion thereof An engagement lever 34' has a stopper pin 34b' mounted on the free end portion thereof. The stopper pin 34b' is received in the cutaway portion 70a of the tilt limit lever 70 when the tilt limit lever 70 is in the operative position. Accordingly, when the tilt limit lever 70 is in the operative position, tilt of the steering wheel 20 is permitted in the range between the position in which the stopper pin 34b' abuts against the front end wall of the cutaway portion 70a and the position in which the stopper 34b' abuts against the rear end wall of the cutaway portion 70a. In this embodiment, the teeth 30a' on the fixed tooth member 30' is continuous unlike the teeth 30a on the fixed tooth member 30 in the tilt mechanism 26 shown in FIGS. 2A and 2B where a shoulder is formed between the front and rear portions. In this embodiment, the portion of the teeth 30a' with which the tooth 34a' of the engagement lever 34 can be engaged when the tilt limit lever 70 is in the operative position corresponds to the front portion of the teeth 30a in the tilt mechanism 26 shown in FIGS. 2A and 2B, i.e., the angular range C. On the other hand, when the tilt limit lever 70 is in the retracted position, the stopper pin 34b' of the engagement lever 34' is not interfered with by the tilt limit lever 70, and accordingly, the steering wheel 20 can be tilted beyond the upper limit of the angular range C, where the tooth 34a' is engaged with the rear portion of the teeth 30a' as shown in FIG. 4B.

The bracket 32' which supports the engagement lever 34' is provided with a stopper piece 32a' which limits the rotation of the engagement lever 34' in the counterclockwise direction.

In this embodiment, the tilt lock switch 36' is mounted on the movable part 16M of the steering column 16 and the operating lever 28' is carried by the movable part 16M. When the operating lever 28' is clockwisely rotated relative to the movable part 16M, a projection 28c' on the operating lever 28' releases the tilt lock switch 36' and the tilt lock switch 36' is turned on.

We claim:

1. A steering system for a vehicle comprising a tilt mechanism for adjusting the height of a steering wheel, wherein said tilt mechanism comprises:
   a lock means which locks the steering wheel in a plurality of desired positions within a larger angular range,
   a lock release means which releases the lock means to permit the steering wheel to be tilted within the larger angular range, and
   a tilt limit means which inhibits the steering wheel from being tilted out of a smaller angular range while the vehicle is running, the smaller angular range being included in the larger angular range;
   wherein said lock means comprises a fixed engagement member which is held stationary relative to the vehicle body and a movable engagement member which is movable together with the steering wheel relative to the fixed engagement member, the fixed engagement member and the movable engagement member being adapted to be engaged with each other in a plurality of positions to lock the steering wheel in a plurality of desired positions within said larger angular range, and said lock release means comprises a third engagement member which is movable between a first position in which it urges the movable engagement member to be engaged with the fixed engagement member and a second position in which it releases the movable engagement member and permits the movable engagement member to move relative to the fixed engagement member, said tilt limit means preventing the movable engagement member from being moved relative to the fixed engagement member out of a predetermined range which corresponds to said smaller angular range even if the third engagement member is in the second position while the vehicle is running.

2. A steering system as defined in claim 1 in which said tilt limit means comprises a fourth engagement member which is movable between an operative position in which it engages with said movable engagement member and prevents it from moving out of the predetermined range and a retracted position in which it permits the movable engagement member to move out of the predetermined range when the third engagement member is in the second position, the fourth engagement member being held in the operative position while the vehicle is running.

3. A steering system as defined in claim 2 in which said fourth engagement member is moved to the retracted position when the vehicle speed is zero and a parking brake is applied.

4. A steering system as defined in claim 3 in which said vehicle is provided with an automatic transmission having a selector lever and said fourth engagement member is moved to the retracted position when the vehicle speed is zero, a parking brake is applied and the selector lever is in P.

5. A steering system as defined in claim 4 in which said fourth engagement member is moved to the retracted position when the vehicle speed is zero, a parking brake is applied, the selector lever is in P and said third engagement member is moved away from the first position.

6. A steering system for a vehicle comprising a tilt mechanism for adjusting the height of a steering wheel, wherein said tilt mechanism comprises:

a lock means which locks the steering wheel in a plurality of desired positions within a larger angular range, a lock release means which releases the lock means to permit the steering wheel to be tilted within the larger angular range, and a tilt limit means which inhibits the steering wheel from being tilted out of a smaller angular range while the vehicle is running, the smaller angular range being included in the larger angular range; wherein said lock means comprises a fixed engagement member which is held stationary relative to the vehicle body and a movable engagement member which is movable together with the steering wheel relative to the fixed engagement member, the fixed engagement member and the movable engagement member being adapted to be engaged with each other in a plurality of positions to lock the steering wheel in a plurality of desired positions within said larger angular range, and said lock release means comprises a third engagement member which is movable among a first position in which it urges the movable engagement member to be engaged with the fixed engagement member, a second position in which it releases the movable engagement member but permits the movable engagement member to move relative to the fixed engagement member only in a predetermined range which corresponds to said smaller angular range, and a third position in which it releases the movable engagement member and permits the movable engagement member to move out of the predetermined range, said tilt limit means preventing the third engagement member from moving to the third position while the vehicle is running.

7. A steering system as defined in claim 6 in which said tilt limit means comprises a fourth engagement member which is movable between an operative position in which it engages with said third engagement member and prevents the third engagement member from moving to said third position and a retracted position in which it permits the third engagement member to move to the third position, the fourth engagement member being held in the operative position while the vehicle is running.

8. A steering system as defined in claim 7 in which said fourth engagement member is moved to the retracted position when the vehicle speed is zero and a parking brake is applied.

9. A steering system as defined in claim 8 in which said vehicle is provided with an automatic transmission having a selector lever and said fourth engagement member is moved to the retracted position when the vehicle speed is zero, a parking brake is applied and the selector lever is in P.

10. A steering system as defined in claim 9 in which said fourth engagement member is moved to the retracted position when the vehicle speed is zero, a parking brake is applied, the selector lever is in P and said third engagement member is moved away from said first position.

11. A steering system as defined in claim 1 further comprising a means for informing that the steering wheel is tilted out of said smaller angular range.

12. A steering system as defined in claim 11 in which said means is a warning lamp.

13. A steering system as defined in claim 1 in which said tilt limit means permits the steering wheel to be tilted out of the smaller angular range when the vehicle speed is zero.

14. A steering system as defined in claim 14 in which said tilt limit means permits the steering wheel to be tilted out of the smaller angular range when the vehicle speed is zero and a parking brake is applied.

15. A steering system as defined in claim 14 in which said vehicle is provided with an automatic transmission having a selector lever and said tilt limit means permits the steering wheel to be tilted out of the smaller angular range when the vehicle speed is zero, a parking brake is applied and the selector lever is in P.

16. A steering system as defined in claim 15 further comprising an inhibiting means which does not permit the selector lever to move from P until the steering wheel is returned to a position within the smaller angular range.

17. A steering system as defined in claim 16 in which said inhibiting means does not permit the selector lever to move from P until the steering wheel is returned to a position within the smaller angular range and the foot brake is applied.

18. A steering system as defined in claim 1 further comprises a means for inhibiting the starter motor of the vehicle from being energized when the steering wheel has been tilted out of the smaller angular range.

19. A steering system as defined in claim 1 further comprising a warning lamp for informing that the steering wheel has been tilted out of said smaller angular range.

20. A steering system as defined in claim 6 further comprising a means for informing that the steering wheel is tilted out of said smaller angular range.

21. A steering system as defined in claim 20 in which said means is a warning lamp.

22. A steering system as defined in claim 6 in which said tilt limit means permits the steering wheel to be tilted out of the smaller angular range when the vehicle speed is zero.

23. A steering system as defined in claim 22 in which said tilt limit means permits the steering wheel to be tiled out of the smaller angular range when the vehicle speed is zero and a parking brake is applied.

24. A steering system as defined in claim 23 in which said vehicle is provided with an automatic transmission having a selector lever and said tilt limit means permits the steering wheel to be tilted out of the smaller angular range when the vehicle speed is zero, a parking brake is applied and the selector lever is in P.

25. A steering system as defined in claim 24 further comprising an inhibiting means which does not permit the selector lever to move from P until the steering wheel is returned to a position within the smaller angular range.

26. A steering system as defined in claim 25 in which said inhibiting means does not permit the selector lever to move from P until the steering wheel is returned to a position within the smaller angular range and the foot brake is applied.

27. A steering system as defined in claim 6 further comprises a means for inhibiting the starter motor of a vehicle from being energized when the steering wheel has been tilted out of the smaller angular range.

28. A steering system as defined in claim 6 further comprising a warning lamp for informing that the steering wheel has been tilted out of said smaller angular range.

* * * * *